(12) United States Patent
Bullock

(10) Patent No.: US 7,290,969 B2
(45) Date of Patent: Nov. 6, 2007

(54) OVERLAND CARGO RESTRAINT SYSTEM AND METHOD

(76) Inventor: Matthew Bullock, 4509 N. 7th St., Arlington, VA (US) 22203

( * ) Notice: Subject to any disclaimer, the term of this patent is extended or adjusted under 35 U.S.C. 154(b) by 272 days.

(21) Appl. No.: 11/127,190

(22) Filed: May 12, 2005

(65) Prior Publication Data

US 2006/0257224 A1 Nov. 16, 2006

(51) Int. Cl.
*B60P 7/08* (2006.01)
(52) U.S. Cl. .................. 410/97; 410/34; 410/118
(58) Field of Classification Search .............. 410/32, 410/34, 36, 42, 96, 97, 100, 117, 118, 155; 220/1.5; 206/410, 597; 53/399, 441, 462, 53/556; 248/499
See application file for complete search history.

(56) References Cited

U.S. PATENT DOCUMENTS 4,264,251 A * 4/1981 Blatt .......................... 410/100

\* cited by examiner

*Primary Examiner*—Stephen Gordon
(74) *Attorney, Agent, or Firm*—Bradford Kile, Esq.; Kile Goekjian Reed & McManus

(57) ABSTRACT

The present invention is directed to a load restraining system and method for securing cargo within a transport container, which is subject to shifting forces. A system includes first and second load restraining strips that cab be self-adhered onto interior wall surfaces of a transport container and extend across cargo within the container. The first load restraining strip has a first adhesive element, which can engage an interior wall surface, and a second adhesive element on a second side, which can engage a surface of cargo to be restrained. A second load restraining strip has a third adhesive element on a first side, which engage an interior wall surface of the container. A fourth adhesive element connected to one of the load restraining strips is operable to secure the two load restraining strips together. A method for securing cargo within a transport container includes providing first and second load restraining strips having adhesive elements, attaching each load restraining strip to internal wall surfaces of a transport container, wrapping the free ends of the load restraining strips around cargo to be restrained, and mutually securing the load restraining strips across cargo.

35 Claims, 6 Drawing Sheets

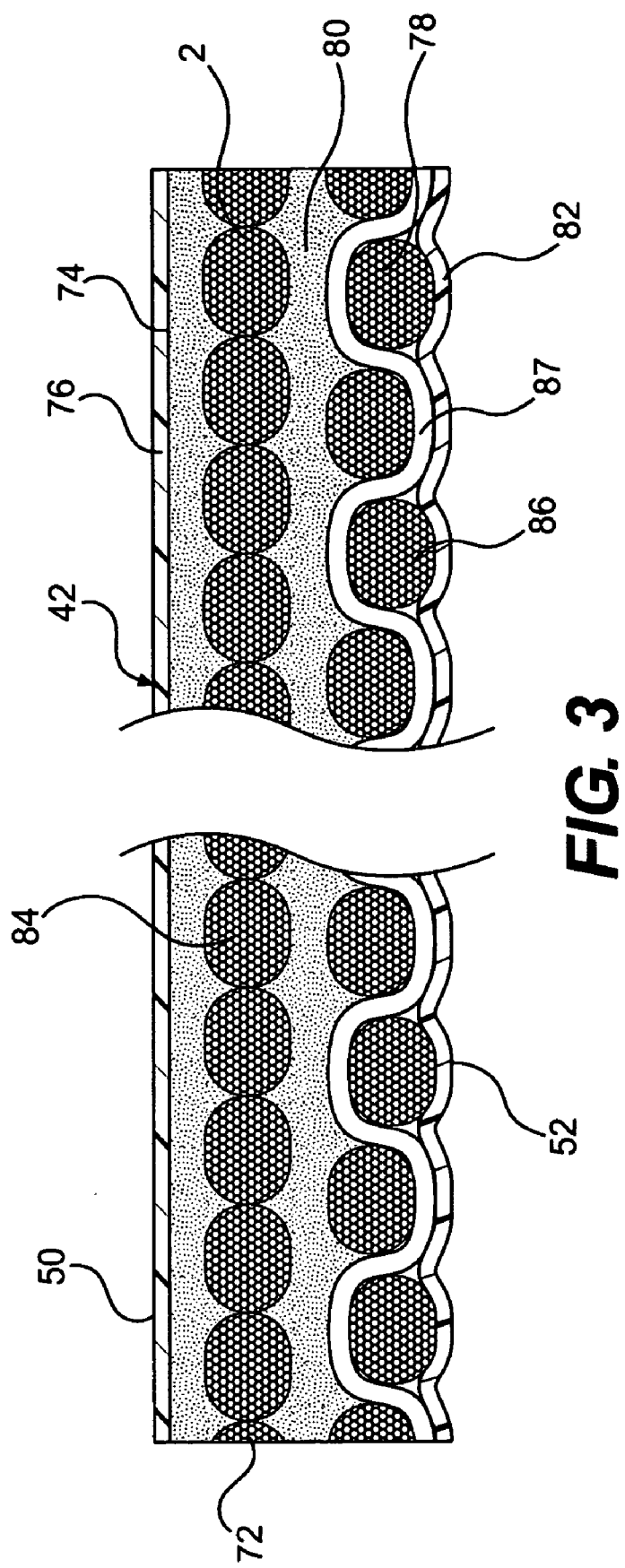

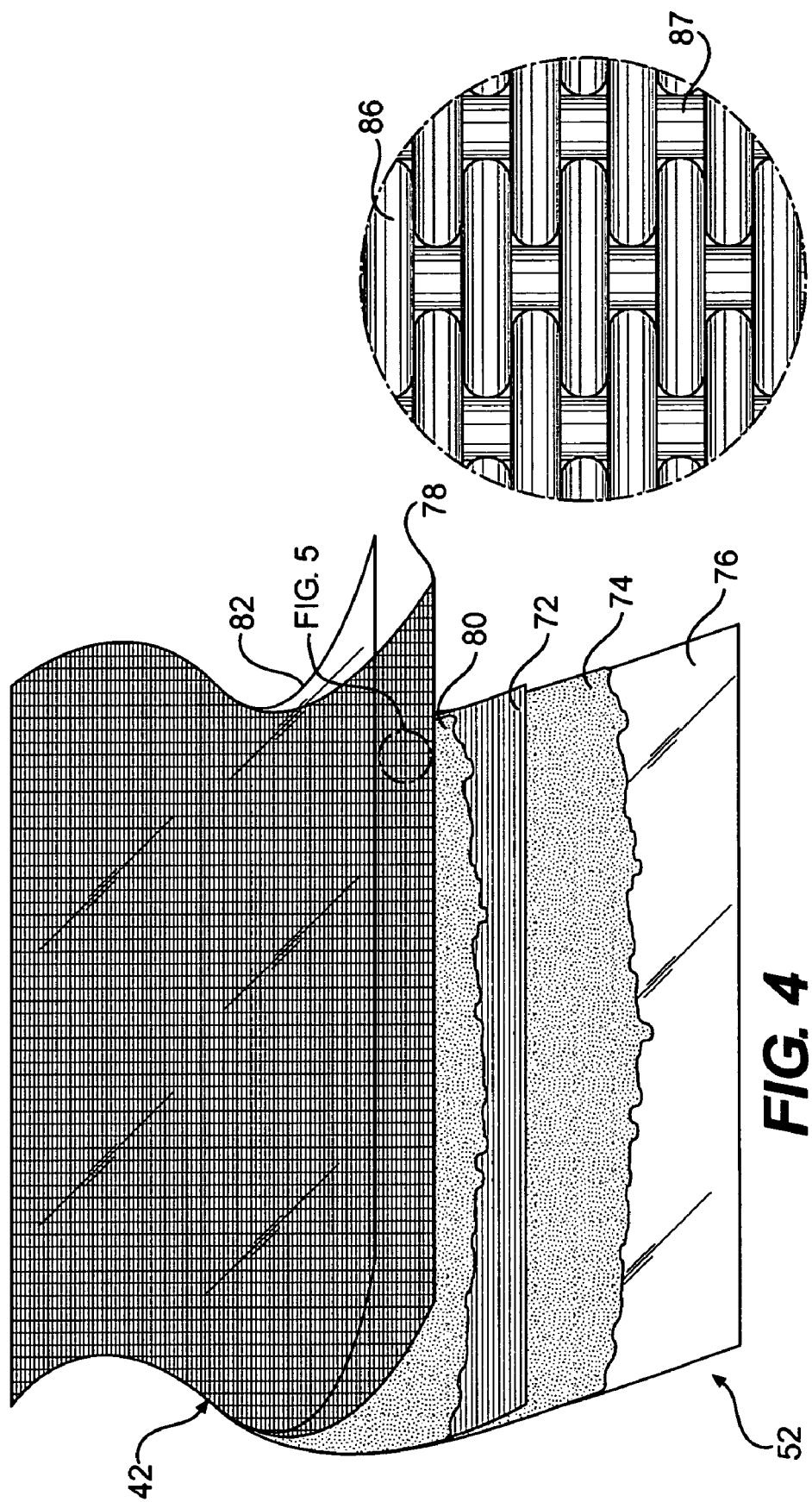

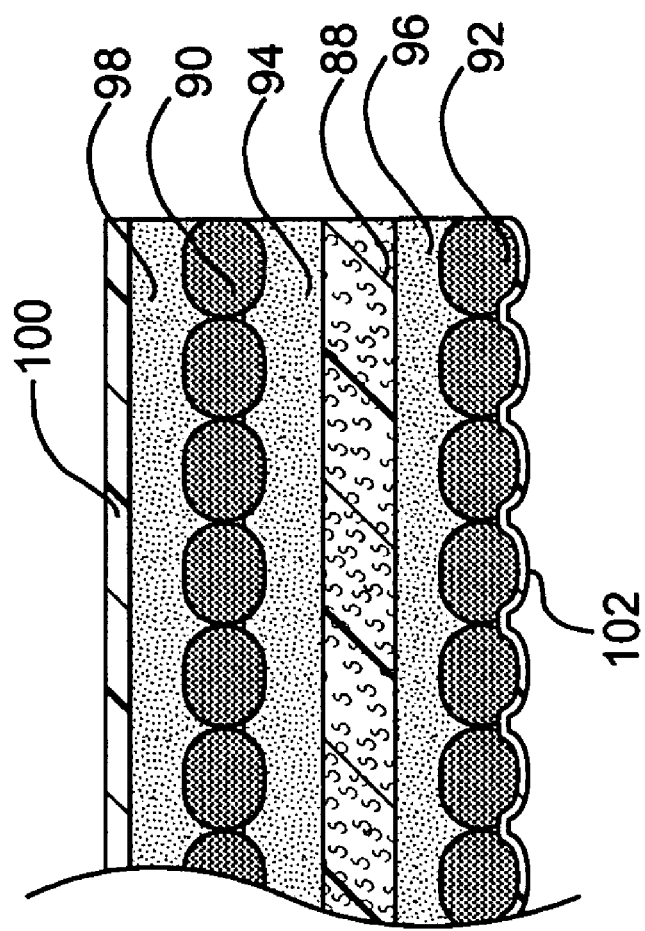
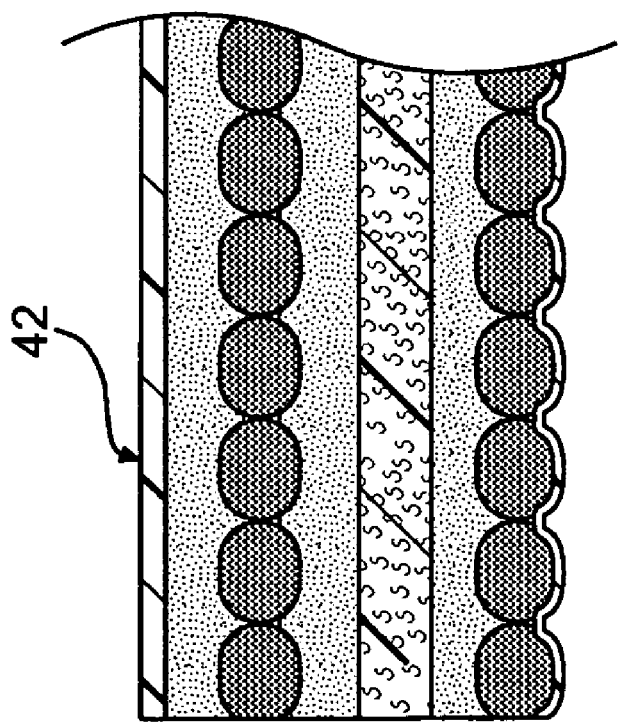
FIG. 6

OVERLAND CARGO RESTRAINT SYSTEM AND METHOD

RELATED PATENTS

This application relates to U.S. Pat. No. 6,089,802 entitled "Cargo Restraint System for a Transport Container" issued on Jul. 18, 2000; U.S. Pat. No. 6,227,779 entitled "Cargo Restraint Method for a Transport Container" issued on May 8, 2001; and U.S. Pat. No. 6,607,337 entitled "Cargo Restraint System" issued on Aug. 19, 2003, all of common inventorship and assignment as the subject application. This application further relates to application for patent Ser. No. 10/730,024 entitled "Laminated Cargo Restraint System and Method" filed on Dec. 9, 2003; application for patent Ser. No. 10/730,025 entitled "Monolithic Cargo Restraint System and Method", filed on Dec. 9, 2003; application for patent Ser. No. 10/730,042 entitled "Cross-weave Cargo Restraint System and Method", filed on Dec. 9, 2003; and application for patent Ser. No. 10/730,040 entitled "Cargo Restraint System and Method", filed on Dec. 9, 2003.

BACKGROUND OF THE INVENTION

This invention relates to an improved system and method for restraining cargo during transportation. More particularly, this invention relates to a novel system and method for securing and restraining undesired movement of cargo such as drums, boxes, rigid and flexible containers—palletized or not palletized—within the interior of an overland transport container such as a truck body, a truck trailer, railroad box car or the like.

Overland transport containers are often loaded with cargo in containment enclosures such as fifty five gallon closed head drums, super sacks or plastic reinforced bags, plastic wrapped bundles or cased goods. Moreover overland cargo can include non-contained metal coils, specialty heavy paper rolls, plastic or metal containers mounted on pallets, boxes, plastic wrapped pallets and the like. Although each containment enclosure or bundle may be quite heavy and stationary at rest, the mass of a transport load can produce considerable momentum force as overland cargo is placed in motion. In this regard trucks are subject to stopping and starting forces, emergency braking, bumps and swaying from uneven road beds, centrifugal forces on curves, vibration, etc., which tend to shift loads.

In addition to being pulled by truck tractors over highways, overland route containers are often positioned on railroad flat cars or cargo is loaded directly in box cars. Rail cars may be made up by a coupling or humping process within a switching yard. When a railroad car is rolled into a stationary string of cars, the impact causes the car couplings to lock together with a jolt. This impact can apply a significant impulse force to cargo within or upon the rail car. Moreover, during transport, railway cars are subject to braking forces, run-in and run-out coupler impacts over grades, rail vibration, dips in the track, and swaying.

Each of these overland forces has the potential to impart a substantial force onto cargo within an overland container. In this, when an overland container changes direction or speed, cargo within the container tends to continue along the previously existing path until it contacts an interior wall of the container. Without some type of restraint and/or cushioning system, the cargo builds up considerable momentum, independent of the container. The amount of momentum is equal to the mass of a load multiplied by its velocity. Accordingly it will be appreciated that in the case of large cargo loads, even a small change in velocity or direction can generate substantial forces.

When cargo contacts the interior walls or doors of a transport container, the force necessary to reduce its momentum to zero must be absorbed by the goods and/or the container. Such forces can result in damage to the cargo, damage to the interior walls or doors of the container, damage to the cargo packing, and may create dangerous leaks if the cargo is a hazardous material. Accordingly, it is undesirable to permit cargo to gain any momentum independent of a container during transport. This is accomplished by restraining the cargo within the container so that the cargo and the container are essentially united and operationally function as one object during transport.

In order to secure cargo during transport and minimize undesired shifting and damage load containment enclosures are often secured to the floor and/or sides of the trailer or boxcar by specially fabricated wood framing, floor blocking, rubber mats, steel strapping, heavy air bags, etc. Each of these previously known systems for securement has limitations associated with construction cost, lack of strength sufficient to secure heavy loads, etc. Moreover, although rear doors of a trailer may be relied on to at least partially secure non-hazardous materials such as food-stuffs, tissue or soft paper products, furniture, appliances, etc., for hazardous materials, and many other types of loads, the rear doors of a container may not be used to even partially secure a load. In fact, in order to comply with Department of Transportation Regulations and Bureau of Explosives, hazardous materials are not even permitted to come in contact with rear doors during an impact.

Still further, in some instances a trailer or boxcar may be used for shipping where only a partial load is carried. A partial load might be positioned within a center location of a trailer. In this instance it may be impractical to construct wooden front and rear dunnage sufficient to secure a load where the front of the trailer is not utilized.

In the past, various dunnage materials have been utilized within overland containers to eliminate unwanted movement or shifting of a load during transport. The drums, boxes, or other containers have been restrained in several different ways. Primarily, cargo was stabilized by a method of load-locking and lumber bracing. This system involves strategically placing lumber between a load face and the rear doors of a transport container. This, however, can be a costly, time consuming, and generally inefficient means of securing a load. In this, the blocking process requires carpenters and is often outsourced to contractors. Moreover, wooden barriers can be time consuming to install. Further wood bracing can be somewhat brittle and subject to failure as a result of an abrupt impact.

When wood bracing is utilized as a system of restraint, because of the bracing system bulk, shippers may be forced to ship containers that are not filled to capacity. This reduces transport efficiency and increases transportation costs. Moreover, some types of wood, such as conifer woods, are not acceptable to cross international boundaries without certification of special fumigation or heat treatment processing of conifer wood dunnage.

Other known means of restraint such as ropes, metal or plastic straps or stands and the like appearing in the past have tended to exhibit impaired performance and are often not functionally suitable to restrain loads under even moderate conditions. Consequently, a need exists for securing lading in truck trailers, boxcars, and other overland containers that is functionally effective, cost-efficient, labor-efficient, and able to comply with Department of Transportation and Bureau of Explosives regulations. Still further a need exists for securement systems that have an enhanced means of application to facilitate cost and efficient use of relatively unskilled labor for loading operations.

In addition to the above, other restraining systems known in the past required multiple elements and equipment which were cumbersome to store, were arduous to install, and often required a degree of skilled labor. Systems using straps, nails, anchors, bolts, or other tools all require substantial storage space even when not in use. Furthermore, such systems increase the safety risk to the workers restraining the cargo. Still further such systems have often been unable to satisfy safety and travel limits imposed by regulatory bodies in various countries.

In addition to the above concerns, systems and procedures used in the past relying on accessories located within the cargo container were often not able to secure a partial load. That is, if the load does not extend to the front or rear of the container, such as a centrally located load, the necessary anchors may not be available in an area where they can be effectively used.

At least one method and apparatus for restraining cargo movement which overcomes some of the foregoing limitations is disclosed in U.S. Pat. No. 4,264,251, of common assignment with the subject application. The invention disclosed in that patent comprises sealing strips that are adhered to opposing sidewalls of a container, a strip of bracing material, and a joining mechanism is used to bind the ends of the strips together into a secure and taut restraint.

In the '251 patent, flexible securement strips are applied in a manner similar to hanging wallpaper, wherein an adhesive is applied onto a surface within a trailer where adhesion is desired. Then a retaining strip is applied to the adhesive. In addition to this requirement of a separate adhesive, systems appearing in the past sometimes encountered problems associated with weakness at the joints. At the juncture where the strips came together, an opportunity existed for slippage of the joined panels.

In addition to the restraining system disclosed in U.S. Pat. No. 4,264,251 other systems have been developed that provide enhanced operating characteristics and advantages, as discussed in the above identified U.S. Pat. Nos. 6,089,802; 6,227,779 and 6,607,337 all of common inventorship and assignment as the subject application. The disclosures of these prior four patents, of common assignment as the subject application, are hereby incorporated by reference as though set forth at length.

Further to these prior systems of securing lading increasing attention has been placed on securing lighter loads on overland routes, without abandoning the advantages achieved by previously known commercial systems. Moreover, there is interest in facilitating placement or application and facilitating the securement function so that cargo materials can be transported with enhanced efficiency and security.

In addition, systems and procedures used in the past, which were satisfactory, and even essential, for certain demanding purposes often were more than required for securing certain loads, for example loads for land transport, where the cargo is not subject to the same level of forces as intermodal cargo containers transported by ship.

The problems suggested in the preceding are not intended to be exhaustive but rather are among many which may tend to reduce the effectiveness of cargo restraining systems known in the past. Other noteworthy problems may also exist; however, those presented above should be sufficient to demonstrate that overland cargo-restraining systems appearing in the past will admit to worthwhile improvement.

OBJECTS AND SUMMARY OF THE INVENTION

Objects

It is a general object that the subject invention provide a novel system and method to secure a load within a transport container which will obviate or minimize problems and concomitantly achieving many of the desired aspects of lading securement of the type previously described.

It is another general object of the subject invention to judiciously protect cargo from damage during transport and to provide enhanced securement of a load within a container while minimizing shifting of a container load for overland transport.

It is a specific object of the invention to provide a securement system and method for an a truck body, truck trailer, railroad boxcar, and the like, with enhanced ease of application to restrain a load in position during impact and/or other transport forces and reduce travel of lading within an overland transport container.

It is a related object of the invention to provide a securement system and method for a truck body, truck trailer, railroad boxcar, or other overland carrier, and the like, where the amount of load travel for a given level of impact is minimized.

It is another object of the subject invention to reduce the equipment, material and labor costs involved in securing lading within an overland transport container, and the like.

It is a particular object of the subject invention to provide a method for securing cargo that is self-contained and may be installed quickly, reliably, and efficiently by relatively unskilled labor without using specialty tools and the like.

It is another object of the subject invention to provide for efficient and simple removal of the securing system from an overland transport container, or the like, at a cargo destination.

It is still a further object of the subject invention to provide a system for restraining cargo that is able to withstand a wide range of temperatures and levels of humidity to enable effective use in a wide range of ambient environments.

BRIEF SUMMARY OF THE INVENTION

One preferred embodiment of the invention, which is intended to accomplish at least some of the foregoing objects, comprises a system for securing cargo within a transport container, such as a truck body, truck trailer, railroad boxcar or the like using two load restraining strips containing self-adhering adhesive elements. Adhesion of the load restraining strips to the container walls is provided by an adhesive element that is applied to the side walls of the transport container. The two restraining strips are held tightly and facilely and secured to each other and the cargo by further adhesive elements applied to the cargo and to an overlapping area between the two load restraining strips.

THE DRAWINGS

Other objects and advantages of the present invention will become apparent from the following detailed description of preferred embodiments taken in conjunction with the accompanying drawings wherein:

FIG. 3 depicts a detailed cross-sectional view taken along section line 3-3 in FIG. 2 of a load restraining strip exhibiting one form of an enhanced strength load restraining strip in accordance with one embodiment of the invention;

FIG. 4 is a partially expanded view of a segment of the present invention showing various layers of a restraining strip in accordance with one embodiment of the invention;

FIG. 5 is a detailed plan view of the circled layer area from FIG. 4 and shows a detailed cross-weave pattern;

FIG. 6 is a detailed cross-sectional segment of a load restraining strip similar to FIG. 3 but with an alternate preferred strengthening pattern and a monolithic load restraining strip.

DETAILED DESCRIPTION

Context of the Invention

Figure 1:
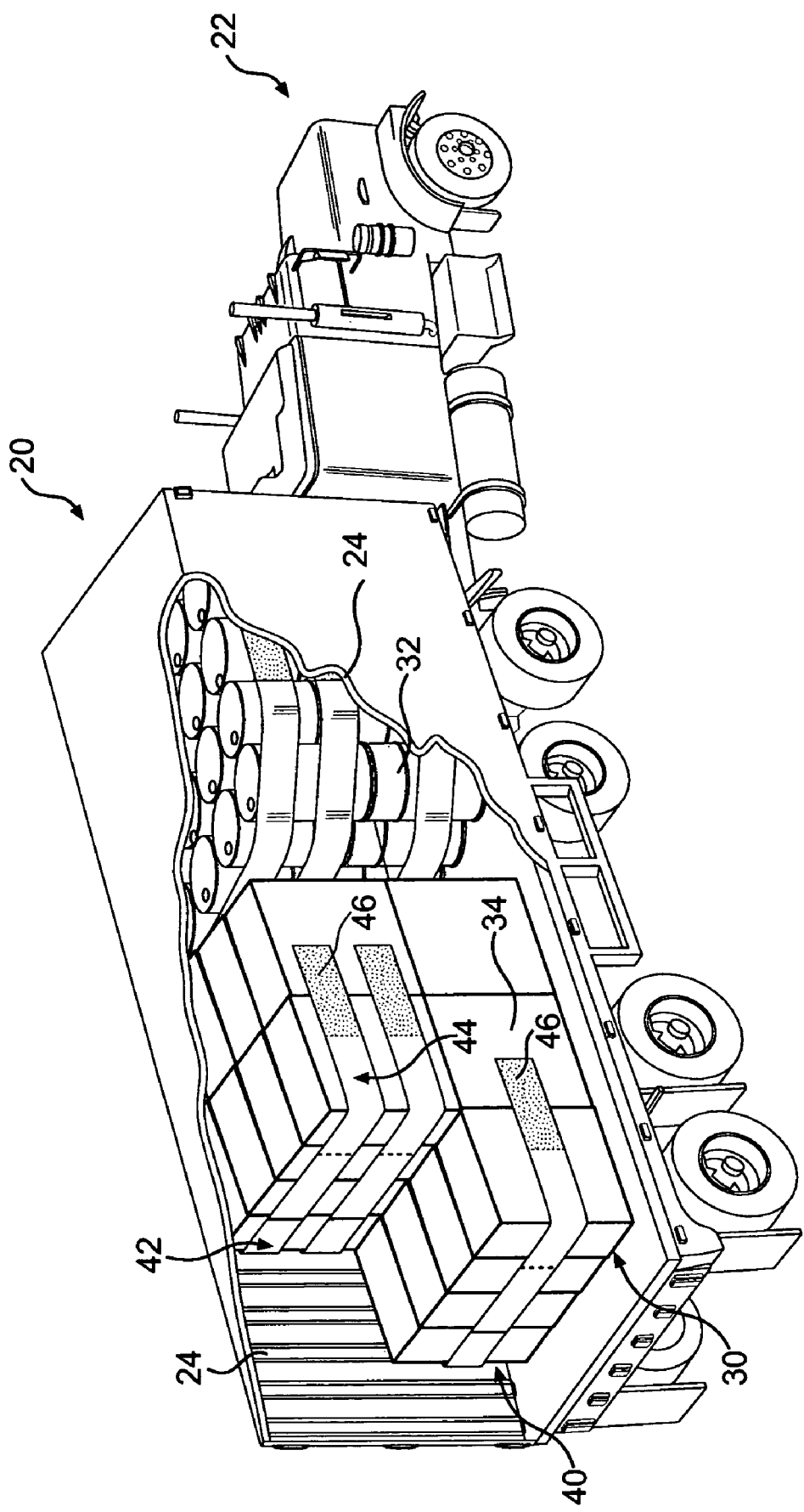
FIG. 1 is an axonometric view showing the interior of a transport container secured to a flatbed of a truck, with cargo stabilized within the container.

FIG. 1 shows an axonometric view of an operating environment of the invention. In this view, a transport or cargo container 20, such as a truck body or truck trailer, is shown towed by a tractor 22 for land transport. Trailers 20 such as these are also operable to be mounted on railway flat cars. Trailer 20 carries cargo 30 to be restrained, such as fifty five gallon drums 32, boxes 34, plastic wrapped pallets, and the like (not shown).

A partially cut away portion of FIG. 1 depicts a load restraining system 40 in accordance with the invention, which is operable to be adhered to an interior wall surface 24 of the trailer 20. The load restraining system 40 shown in FIG. 1 comprises a pair of opposing restraining strips. A first load restraining strip 42 and a second load restraining strip 44 are adhered to the interior side walls 24 of the trailer 20 by the use of adhesive elements 46 that are operable to self adhere to opposing interior side walls 24 of the transport container. The restraining strips 42 and 44 then extend to be wrapped around and embrace the cargo 30. The first restraining strip 42 and second restraining strip 44 overlap across the face of a load and are held tightly to the cargo 30 and to each other by adhesive elements (not shown in FIG. 1).

FIG. 1 depicts a preferred embodiment showing the first load restraining strip 42 and the second load restraining strip 44 adhered to opposing interior side walls 24 of the transport container 20 by adhesive elements 46. It is also contemplated that the first load restraining strip 42 and second load restraining strip 44 may adhere to other than opposing interior side walls, for example by adhering to the same wall and by wrapping around two entire sides and front of the cargo 30 or where one or both load restraining strips 42 and 44 adhere to an interior front wall of the container 20.

Load Restraining Strips

Figure 2:
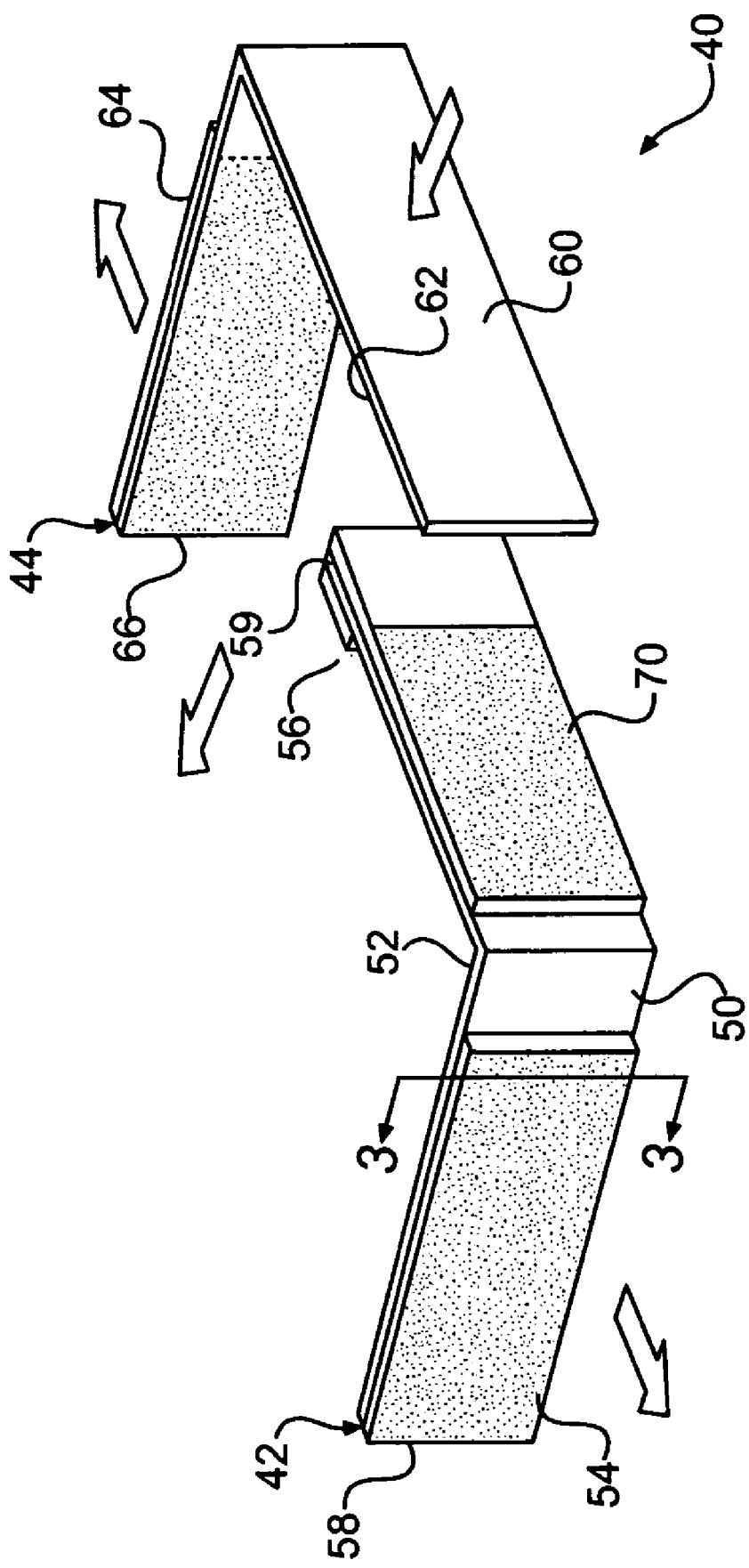
FIG. 2 is a pictorial view of two opposing load restraining strips and their respective adhesive elements, with exaggerated thickness, to depict one preferred embodiment of the invention.

FIG. 2 is a pictorial view of the two load restraining strips and their respective adhesive elements in accordance with one embodiment of this invention, with exaggerated thickness employed for purposes of illustration. In FIG. 2, a first load restraining strip 42 has a first side 50 and a second side 52. In the depicted embodiment, the first load restraining strip 42 carries a first adhesive element 54 located generally on one end 58 of the first side 50, which is operable to engage an interior wall surface of a transport container. A second adhesive element 56 is located generally on an opposite end 59, and on the second side 52, of the first load restraining strip 42. The second adhesive element 56 is operable to engage, a surface of cargo to be restrained within the container.

A second load restraining strip 44 similarly has a first side 60 and a second side 62. The second load restraining strip 44 has a third adhesive element 64 positioned at one end 66 on its first side 60, which is operable to engage an interior side wall surface of the transport container.

In this embodiment, a fourth adhesive element 70 is located either on the first side 50 of the first load restraining strip 42, as shown, or on the second side 62 of the second load restraining strip 44 at a location opposing the location of the element 70 depicted in FIG. 2. Alternatively, an adhesive element can be placed on both of the first side of the first load restraining strip and an opposing second side of the second load restraining strip. In other words, the fourth adhesive element 70 is located generally in the overlapping area between the first 42 and second 44 load restraining strips and is operable to secure the first 42 and second 44 load restraining strips together.

The first load restraining strip 42 and second load restraining strip 44 are pliant and flexible while concomitantly resistant to axial lengthening or extension under tension loading. The load restraining strips 42 and 44 are preferably manufactured and transported on reels or rolls, which are manufactured in an end-to-end continuous fashion. The strips may be transversely perforated, at approximately uniform lengths, so that a strip 42 or 44 can be torn off or in any event can be facilely cut to create a single approximately uniform length of restraining strip 42 or 44 for use, in situ, on a job site. Preferably, the restraining strips 42 and 44 are ten inches in width and ten feet in length; however, other widths and lengths may be substituted depending on the need for additional strength, which a wider strip can provide.

Each of the load restraining strips 42 and 44 have adhesive elements 54 and 64, on first side surfaces, 50 and 60, respectively, for engaging an interior wall surface of a transport container. The adhesive elements 54 and 64 are preferably composed of an acrylic that exhibits a high degree of adhesiveness and shear strength and bonds well to wood and/or metal surfaces. In addition, the adhesive exhibits excellent high temperature and cold temperature characteristics so that the transport container is operable to be shipped in all normal ambient shipping conditions. Finally, the adhesive should have high shear strength to secure a load and concomitant low peel strength characteristics so that when a transport container is unloaded the load restraining strips may be facilely removed by being peeled away from the sidewall surfaces by hand without leaving an adhesive residue.

In a preferred embodiment each of the first 54 and third 64 adhesive elements are positioned generally at the ends 58 and 66 of the first 42 and second 44 load restraining strips, respectively, and extend in a continuous coating to adhere to flat wall surfaces of a container.

In the embodiment of the invention shown in FIG. 2, the restraining strips 42 and 44 have adhesive elements 54 and 64 across a continuous longitudinal region, even though only the land surfaces of the internal walls of a transport container will come in contact with the adhesive layer. This arrangement has the advantage that a single design will accommodate all forms of flat wall or corrugated sidewall containers.

At a more specialized level, and in accordance with another aspect of the invention, the outer adhesive elements, such as elements 54 and 64, may be applied to the load restraining strips 42 and 44 in transverse strips. The strips correspond in width and spacing to the land surfaces of the side wall of a corrugated cargo container. Accordingly, in a preferred embodiment, this spacing materially reduces the amount of adhesive that is necessary for any specific container design.

In a preferred embodiment, the second adhesive element 56 is located generally at the other end 59 of the first load restraining strip 42. The second adhesive element 56 is operable to at least partially engage a face of the cargo to be restrained within the container. In a preferred embodiment, the second adhesive element 56 is composed of the same material as adhesive elements 54 and 64.

The fourth adhesive element 70 is operable to bind the first load restraining strip 42 with the second load restraining strip 44 across the face of a load. In a preferred embodiment, the fourth adhesive element 70 is located on the first load restraining strip 42 generally between the first adhesive element 54 and the opposite end 59 of the first load restraining strip 42. One of skill in the art will appreciate that the fourth adhesive element 70 can be alternatively located elsewhere on the first side 50 of the first load restraining strip 42 or on the second side 62 of the second load restraining strip 44. In a preferred embodiment, the fourth adhesive element 70 is composed of the same material as adhesive elements 54 and 66.

FIGS. 3 and 4 depict detailed cross-sectional and pictorial views of a load restraining strip composed of a cross-weave with enhanced strength, in accordance with one embodiment of the invention. More specifically, FIG. 3 is taken along section line 3-3 in FIG. 2 and illustrates one embodiment of the load restraining strip 42, which is shown in cross section having a first side 50 and a second side 52. The main body of the load restraining strip 42, which is continuous throughout the strip, comprises a layer of parallel longitudinal strands 72 of glass or plastic fiber extending along the length of the restraining strip 42, adhesive layer 80 overlaying and bonding to the surface of the parallel strands layer 72, a second reinforcement layer 78 composed of a cross-weave layer and binding to adhesive layer 80, and a thin layer of outer covering 82. At the particular location of the cross section taken, the load restraining strip 42 further includes an adhesive element 74, and a releasable coating element 76 coextensively covering the adhesive element 74.

FIG. 4 is a partially expanded view of the same cross section shown in FIG. 3 showing the load restraining strip 42 in multiple layers. In this, the load restraining strip 42 is shown having a releasable coating element 76 coextensively covering an adhesive element 74. Adhesive element 74 in turn covers one end of the main body of the load restraining strip 42. The main body of the load restraining strip is composed of a first enforcement layer 72 composed of parallel strands, an adhesive layer 80, a second enforcement layer 78 of cross-weave strands, and a relatively thin outer covering 82.

As shown in FIGS. 3 and 4 each of the strands of the parallel strands layer 72 is composed of a plurality of finer denier strands 84. The reinforcement strands may be composed of fine polyester fibers, polypropylene, polyethylene, polyolefin, glass fiber, aramids including KEVLAR, carbon fibers, and the like. KEVLAR is a polyamide in which all the amide groups are separated by para-phenylene groups. KEVLAR is a registered trademark of the DuPont Company of Wilmington, Del. Individual strand bundles 72 are directly abutted against and adhered to the adhesive layers 74 and 80 as shown in FIGS. 3 and 4.

The outer covering 82 adheres to the outer surface of the main body of the load restraining strip 42 and is preferably a thin layer of biaxially-oriented polyethylene terephthalate polyester film, sold under the trademark MYLAR, although other materials may be used. MYLAR is a registered trademark of the DuPont Company of Wilmington, Del. The coating provides dimensional rigidity to the enforcement layers and a protective clear or opaque coating.

The adhesive layers 74 and 80 are composed of compositions that have a high shear strength, wide operative temperature gradient, including cold weather tackiness, and a specific gravity of less than one to displace moisture from the sidewalls of a container through capillary action. Adhesives of the type that are preferred are available from the Venture Tape Company of Rockland, Mass. The shear strength between the adhesive layers is sufficient to transfer impact load forces to the reinforcing layers.

As shown in FIGS. 3, 4 and 5, the cross-weave layer 78 is preferably composed with a plurality of substantially parallel longitudinal strands 86 extending along the length of the restraining strip 42 and crossing strands 87. The crossing strands 87 are woven into the longitudinal strands 86 and have an adjacent spacing that is approximately twice the spacing of adjacent parallel longitudinal strands 86.

In addition to the main body of the load restraining strip 42, which is continuous throughout the strip and comprises layers of reinforcement, the cross section shown includes an adhesive element 74. Adhesive element 74 is in direct self-adhering contact with the main body of the load restraining strip 42. Adhesive element 74 can be employed to engage an interior wall surface of the transport container as adhesive elements 54 and 64 shown in FIG. 2. Alternatively, adhesive element 74 can be employed to engage another load restraining strip or a face of cargo as adhesive elements 56 and 70 shown in FIG. 2.

The adhesive element 74 has a releasable coating element 76 coextensively extending over it. The releasable coating element 76 enables individual segments of the load restraining strip 42 to be manufactured and stored on a cylindrical core and the coating element 76 is peeled off of the load restraining strip 42 on site so that the adhesive element 74 may be used by an installer to affix the load restraining strip 42 to an internal wall surface of a transport container. Releasable coating elements 76 may similarly cover the second 56 and fourth 70 adhesive elements shown in FIG. 2, allowing an installer to peel away releasable coating elements 76 from the self-adhering adhesive elements of the load restraining strips 42 and 44 to allow them to adhere to the cargo to be restrained and allow the adhesion of the two restraining strips together.

Although a substrate may not be needed for the adhesive layers 74 and 80, in the event a substrate is necessary or desirable a substrate may be used. The substrate may be composed of an acrylic sheet having a plurality of transverse holes, a resin differential polymer with holes to render the substrate porous, or VALERON® which may be fashioned in the form of a screen foundation. Companies such as DuPont, Hoeschst Celanese, and others manufacture such materials. Alternatively, the substrate may not be porous provided that the shear strength of the adhesive materials is sufficient to carry axial loading as discussed below.

The main body of load restraining strip 42 in FIGS. 3, 4, and 5 comprises multiple layers of reinforcement strands 72 and 78, adhesive 80, and outer covering 82. In yet further embodiments, the main body of a load restraining strip may be composed with only of one layer of reinforcement strands, such as parallel strands 72 or a cross-weave strand 78; a layer of reinforcement strand with an outer covering; a layer of reinforcement strand with two outer coverings; two layers of parallel strands such as layer 72; two layers of woven strands such as layer 78; two layers of reinforcement strands with an outer covering; or two layers of reinforcement strands with two outer coverings. One of skill in the art will recognize additional possibilities of various combinations of reinforcement strands, adhesives, and outer coverings to make up the main body of a load restraining strip.

FIG. 6 is a detailed cross-sectional segment of a load restraining strip exhibiting an alternative preferred embodiment of a monolithic restraining strip in accordance with the subject invention. In this embodiment, the main body of the restraining strip 42 includes a first flexible, monolithic, strip of material 88 joined to two strips of parallel strands layers 90 and 92 by intermediate layers of adhesive 94 and 96. At the particular cross section taken, the load restraining strip further includes an adhesive element 98, and a releasable coating element 100 coextensively covering the adhesive element 98.

The monolithic strip 88 is preferably composed of an opaque or transparent composition of high strength polypropylene, high density polyethylene or low density polyethylene, polyethnleneterephtalate, polyethleneterephtalate glycol, polyvinyl chloride, vinyl chloride monomer, or cross laminated polyethylene. These materials are known to those of ordinary skill in the art and sheets of high tensile strength characteristics are available from various high strength film manufacturing companies. As examples, polyethleneterephtalate ("PET") and polyethleneterephtalate glucol ("PETG") copolyester sheets are available as high strength extruded sheets from the Eastman Chemical Company of Kingsport, Tenn. Cross laminated polyethylene is available in a brand known as Valeron from Valeron Strength Films of Houston, Tex. Although these high strength sheet materials are presently preferred other high strength, monolithic extruded sheets of material are within the purview of the subject invention. Moreover, two or more of these materials may be combined to produce a monolithic or even layered composition.

In a preferred embodiment monolithic sheet 88 and parallel strand layers 90 and 92 are joined together as an operating unit by intermediate layers of adhesive 94 and 96. The composition of the adhesive may be chosen from a number of commercially available materials, however, a characteristic that is essential is a high shear strength since the adhesive layer needs to transfer axial loading between the strip of the monolithic material 88 and the parallel strands layers 90 and 92.

The adhesive layer may be applied directly to the inner surfaces of the monolithic sheet 88 during a manufacturing process or may be carried by a central substrate (not shown) which may be a porous spun bond polyester or MYLAR. When a substrate is used each of the adhesive layers 94 and 96 are divided into two portions of approximately equal thickness.

The main body of load restraining strip 42 in FIG. 6 comprises multiple layers consisting of a monolithic layer 88, adhesives 94 and 96, and reinforcement strands 90 and 92 made of parallel strands. A thin layer of MYLAR 102 is applied to the outer layer of parallel strands 92 to provide a protective clear or opaque coating in a manner similar to coating 82 discussed above.

Figure 7:
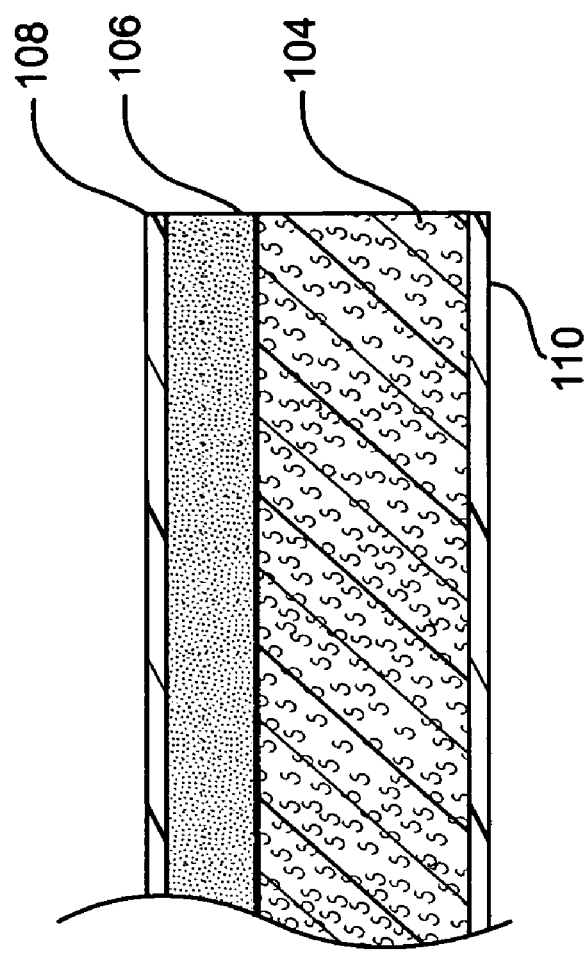
FIG. 7 is a detailed cross-sectional segmenet of a load restraining strip similar to FIG. 3 but with yet another alternative monolithic load restraining strip construction.

Turning now to FIG. 7, there is shown a detailed cross-sectional segment of yet another alternative preferred embodiment of a monolithic load restraining strip 42 in accordance with the subject invention. In this embodiment, the main body of the restraining strip 42 includes only a first flexible, monolithic, strip of material 104. At the particular cross section taken, the load restraining strip 42 further includes an adhesive element 106, and a releasable coating element 108 coextensively covering the adhesive element 74. Finally, as an option, a MYLAR coating 110 may be applied to the outer surface. Depending upon the composition of the monolithic layer 104, it may not be necessary to add a protective layer of MYLAR 110.

The monolithic strip 104 is preferably composed of an opaque or transparent composition of high strength polypropylene, high density polyethylene or low density polyethylene, polyethnleneterephtalate, polyethleneterephtalate glycol, polyvinyl chloride, vinyl chloride monomer, or cross laminated polyethylene.

FIGS. 3, 4, 5, 6, and 7 disclose three structures of enhanced strength, load restraining strips in accordance with the invention. The first, shown in FIGS. 3, 4, and 5 has been referred to as having a cross-weave construction because of layer 78 and the second and third, disclosed in FIG. 6 and FIG. 7, have been referred to descriptively as a reinforced monolithic construction or simply a monolithic construction 88. In yet further embodiments of an enhanced strength restraining strip as discussed in the patents above, the cross-weave or parallel strand layers of the construction illustrated in FIGS. 3, 4, 5, and 6 may be replaced with a parallel strand layers and outer coverings.

Although the above description should be sufficient to enable one of ordinary skill in the art to make and use any of the three constructions of a cross-weave, monolithic or laminated construction in the configurations described, a more detailed description of these various constructions may be had by reference to three related applications for patents, filed on Dec. 9, 2003, and titled "Cross-Weave Cargo Restraint System and Method," "Monolithic Cargo Restraint System and Method", "Cargo Restraint System and Method", and "Laminated Cargo Restraint System and Method," respectively. The disclosures of these three applications and of common inventorship and assignment are hereby incorporated by reference into this application as though set forth at length.

Method of Restraining Cargo

In operation, when it is necessary or desirable to secure cargo within a container, a reel or individual restraining strips 42 and 44 are delivered to a container site. A first restraining strip 42 is selected or drawn from a reel of strips. A release paper such as 76, is peeled by hand off of the first end of a first restraining strip 42 and the strip is then pressed against the sidewall 24 of a container. The other end 59 of the first strip 42 is then drawn tightly by hand around the face of cargo to be restrained and a release paper is peeled off of adhesive 56. The second end of the first strip is then secured in place by adherence of adhesive 56. The second end of the first strip 42 is then temporarily secured to the face of cargo by the adhesive 56. Next, a second restraining strip 42 is similarly applied to an opposing side wall of a container and a second end of the second restraining strip 44 is drawn by hand around the face of the load. An outer release paper is peeled away from the outer surface of adhesive layer 70 and the second ends of the two restraining strips 42 and 44 are secured together by hand and the cargo is ready for transport. At a destination, a reverse operation is performed and the release strips are discarded. As used in this application the term transport container is used in its broadest sense and includes a truck body, tractor trailer, a box car, an intermodal container and any other enclosure suitable for handling cargo.

SUMMARY OF MAJOR ADVANTAGES OF THE INVENTION

Having described in detail the preferred embodiments of the invention, it may be useful to briefly set forth some of the major advantages of the invention.

The subject invention provides a unique method and system for significantly enhancing strength and resistance to shifting of loads within overland transport containers.

The invention also provides a self-contained load restraining system with adhesive elements carried directly on two load restraining strips.

This invention still further provides a product restraining a load having enhanced sheer strength and eliminates peel failure so that a load is securely restrained during transport but upon arrival at the destination, it may be quickly removed and disposed of without leaving a residue on a container interior wall surface.

This invention provides enhanced axial resistance to elongation so that it may be used to securely transport materials overland.

A particular advantage of the subject invention is the capability to secure full or partial loads with enhanced axial strength and resistance to elongation with use of only the land areas of an overland transport container.

Another significant advantage of the subject invention is ability to customize rolls of load restraining strips to the needs of a particular customer.

The invention enables a cross-weave, monolithic or laminated load restraining strip to safely secure an entire load or even a partial load and moreover, to accomplish this without having to brace, nail, anchor, strap, or bolt, thereby substantially reducing labor costs and installation time.

The invention enables the use of multiple transverse adhesive strips corresponding to land areas of corrugated containers such as intermodal containers, significantly saving on the amount of adhesive required while concomintantly providing enhanced resistance to load travel within a corrugated container.

In describing the invention, reference has been made to preferred embodiments. Those skilled in the art, however, and familiar with the disclosure of the subject invention, may recognize additions, deletions, substitutions, modifications and/or other changes which will fall within the purview of the invention as defined in the following claims.

What is claimed is:

1. A load restraining system for securing cargo within a transport container during transport, which cargo is subject to shifting forces, said load restraining system comprising:
   a first load restraining strip having a first side and a second side;
      a first adhesive element connected to said first side of said first load restraining strip, said first adhesive element being operable to engage an interior wall surface of the transport container;
      a second adhesive element connected to said second side of said first load restraining strip, said second adhesive element being operable to engage, at least partially, a surface of cargo to be restrained within the container; and
   a second load restraining strip having a first side and a second side;
      a third adhesive element connected to said first side of said second load restraining strip, said third adhesive element being operable to engage an interior wall surface of the transport container; and
   a fourth adhesive element connected to at least one of said first side of said first load restraining strip and said second side of said second load restraining strip, said fourth adhesive element being operable to engage at least a portion of said first side of said first load restraining strip with said second side of said second load restraining strip for operably securing said first and second load restraining strips together;
   wherein said first and said second load restraining strips are operable to be self-adhered onto interior wall surfaces of the container and extending across cargo within the container, said first load restraining strip being secured in position and adhered at least partially by the second adhesive element to a surface of cargo within the container, and said first and second load restraining strips being operably secured together by said fourth adhesive element to embrace and secure cargo within the container.

2. A load restraining system for securing cargo within a transport container as defined in claim 1 and further comprising:
   at least one releasable coating segment extending coextensively with and releasably adhering to at least one of said first, second, third, and fourth adhesive elements.

3. A load restraining system for securing cargo within a transport container as defined in claim 1 wherein:
   said fourth adhesive element is connected to said first side of said first load restraining strip.

4. A load restraining system for securing cargo within a transport container as defined in claim 1 wherein:
   said first adhesive element and said third adhesive element are operable to be self-adhered onto opposing interior side wall surfaces of the transport container.

5. A load restraint system for securing cargo within a transport container as defined in claim 1 wherein:
   said first and second load restraining strips are approximately ten feet in length.

6. A load restraint system for securing cargo within a transport container as defined in claim 1 wherein:
   said first and second load restraining strips are approximately ten inches in width.

7. A load restraint system for securing cargo within a transport container as defined in claim 1 wherein:
   said first and third adhesive elements are approximately three feet in length.

8. A load restraint system for securing cargo within a transport container as defined in claim 1 wherein:
   said fourth adhesive element is approximately seven feet in length.

9. A load restraint system for securing cargo within a transport container as defined in claim 1 wherein:
   said first and second load restraining strips comprise a polyester substrate and a reinforcing network of fibers.

10. A load restraint system for securing cargo within a transport container as defined in claim 1 wherein:

said first and third adhesive elements compose an acrylic adhesive having the characteristics of self-adherence to a steel interior wall surface of a transport container, and a high sheer strength.

11. A load restraint system for securing cargo within a transport container as defined in claim 1 wherein:
said first and second load restraining strips comprise a spun bonded polyester substrate and a reinforcing material of fibers.

12. A load restraint system for securing cargo within a transport container as defined in claim 1 wherein:
said first and second load restraining strips comprise a substrate and a plurality of reinforcement strands bound to said substrate in a parallel array.

13. A load restraint system for securing cargo within a transport container as defined in claim 1 wherein:
said first and second restraining strips comprise a cross-weave reinforcement material composed of:
substantially parallel longitudinal strands extending along the length of said load restraining strips, and
crossing strands interwoven with said substantially parallel longitudinal strands to produce said cross-weave of reinforcement material.

14. A load restraint system for securing cargo within a transport container as defined in claim 1 wherein:
each of said first and second load restraining strips comprise a monolithic strip of high strength material comprising:
a first flexible, monolithic, strip of material having a first side and a second side.

15. A load restraining system for securing cargo within a transport container as defined in claim 14 wherein said monolithic strip of high strength material further comprises:
a strand of reinforcing material coextensively extending along and adhering to said first side of said first monolithic strip.

16. A load restraining system for securing cargo within a transport container as defined in claim 14 wherein said monolithic strip of high strength material further comprises:
a strand of reinforcing material coextensively extending along and adhering to said second side of said first monolithic strip.

17. A load restraining system for securing cargo within a transport container as defined in claim 14 wherein said monolithic strip of high strength material further comprises:
strands of reinforcing material coextensively extending along and adhering to said first side of said first monolithic strip and said second side of said monolithic strip.

18. A load restraining system for securing cargo within a transport container during transport, which cargo is subject to shifting forces, said load restraining system comprising:
a first load restraining strip having a first side and a second side;
a first adhesive element connected to said first side of said first load restraining strip generally beginning at one end thereof and longitudinally extending along said first load restraining strip, said first adhesive element being operable to engage an interior wall surface of the transport container;
a second adhesive element connected to said second side of said first load restraining strip generally beginning at another end thereof, said second adhesive element being operable to engage, at least partially, a surface of cargo to be restrained within the container;
a second load restraining strip having a first side and a second side;
a third adhesive element connected to said first side of said second load restraining strip generally beginning at one end thereof and longitudinally extending along said second load restraining strip, said third adhesive element being operable to engage another interior wall surface of the transport container; and
a fourth adhesive element connected to at least one of said first side of said first load restraining strip and said second side of said second load restraining strip, said fourth adhesive element being operable to engage at least a portion of said first side of said first load restraining strip with said second side of said second load restraining strip for operably securing said first and second load restraining strips together;
wherein said first and second load restraining strips are operable to be self-adhered onto interior wall surfaces of the container and extending across cargo within the container, said first load restraining strip being secured in position and adhered at least partially by the second adhesive element to a surface of cargo within the container, and said first and second load restraining strips being operably secured by said fourth adhesive element to embrace and secure cargo within the container.

19. A load restraining system for securing cargo within a transport container as defined in claim 18 and further comprising:
at least one releasable coating segment extending coextensively with and releasably adhering to at least one of said first, second, third, and fourth adhesive elements.

20. A load restraining system for securing cargo within a transport container as defined in claim 18 wherein:
said fourth adhesive element is connected to said first side of said first load restraining strip.

21. A load restraining system for securing cargo within a transport container as defined in claim 18 wherein:
said first adhesive element and said third adhesive element are operable to be self-adhered onto opposing interior side wall surfaces of the transport container.

22. A load restraint system for securing cargo within a transport container as defined in claim 18 wherein:
said first and second load restraining strips are approximately ten feet in length.

23. A load restraint system for securing cargo within a transport container as defined in claim 18 wherein:
said first and second load restraining strips are approximately ten inches in width.

24. A load restraint system for securing cargo within a transport container as defined in claim 18 wherein:
said first and third adhesive elements are approximately three feet in length.

25. A load restraint system for securing cargo within a transport container as defined in claim 18 wherein:
said fourth adhesive element is approximately seven feet in length.

26. A load restraint system for securing cargo within a transport container as defined in claim 18 wherein:
said first and second load restraining strips comprise a polyester substrate and a reinforcing network of fibers.

27. A load restraint system for securing cargo within a transport container as defined in claim 18 wherein:
said first and third adhesive elements compose an acrylic adhesive having the characteristics of self-adherence to a steel interior side wall surface of a transport container, and a high sheer strength.

28. A load restraint system for securing cargo within a transport container as defined in claim 18 wherein:
   said first and second load restraining strips comprise a spun bonded polyester substrate and a reinforcing material of fibers.

29. A load restraint system for securing cargo within a transport container as defined in claim 18 wherein:
   said first and second load restraining strips comprise a substrate and a plurality of reinforcement strands bound to said substrate in a parallel array.

30. A load restraint system for securing cargo within a transport container as defined in claim 29 and further comprising:
   a plurality of fiber reinforcement strands bound to said substrate along said first and second load restraining strips with a cross weave pattern to provide enhanced stability of said restraint system during transport.

31. A load restraining system for securing cargo within a transport container as defined in claim 1 wherein:
   said transport container comprises an overland transport container.

32. A load restraining system for securing cargo within a transport container as defined in claim 31 wherein:
   said overland transport container comprises a railroad box car.

33. A load restraining system for securing cargo within a transport container as defined in claim 31 wherein:
   said overland transport container comprises a truck.

34. A load restraining system for securing cargo within a transport container as defined in claim 1 wherein:
   said transport container comprises an intermodal container.

35. A load restraining system for securing cargo within a transport container as defined in claim 1 wherein:
   said transport container comprises an ISO approved container.

* * * * *